(12) United States Patent
Miyauchi

(10) Patent No.: US 9,661,262 B2
(45) Date of Patent: May 23, 2017

(54) CONTENT PROCESSING DEVICE AND CONTENT PROCESSING METHOD

(71) Applicant: Panasonic Intellectual Property Management Co., Ltd., Osaka (JP)

(72) Inventor: Shingo Miyauchi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 178 days.

(21) Appl. No.: 14/668,825

(22) Filed: Mar. 25, 2015

(65) Prior Publication Data

US 2015/0281638 A1     Oct. 1, 2015

(30) Foreign Application Priority Data

Mar. 28, 2014   (JP) .................. 2014-068181
Feb. 3, 2015     (JP) .................. 2015-019338

(51) Int. Cl.
| | |
|---|---|
| H04N 7/01 | (2006.01) |
| H04N 11/20 | (2006.01) |
| H04N 5/445 | (2011.01) |
| H04N 5/45 | (2011.01) |
| H04N 21/431 | (2011.01) |
| G06T 3/40 | (2006.01) |

(52) U.S. Cl.
CPC ....... H04N 7/0122 (2013.01); H04N 5/44591 (2013.01); H04N 5/45 (2013.01); H04N 7/0117 (2013.01); H04N 7/0127 (2013.01); H04N 21/4316 (2013.01); *G06T 3/4038* (2013.01); *H04N 7/01* (2013.01)

(58) Field of Classification Search
CPC ........... H04N 7/01; H04N 7/0122; G06T 3/40

USPC ....... 348/441, 445, 448, 449, 452, 458, 459, 348/555, 558, 575, 581
See application file for complete search history.

(56) References Cited

U.S. PATENT DOCUMENTS

| | | | | |
|---|---|---|---|---|
| 6,204,887 B1* | 3/2001 | Hiroi | ................. | G09G 5/14 |
| | | | | 348/565 |
| 7,333,149 B2* | 2/2008 | Choi | ................. | G06T 3/40 |
| | | | | 348/441 |

(Continued)

FOREIGN PATENT DOCUMENTS

JP          2009-111936 A     5/2009

*Primary Examiner* — Brian Yenke
*Assistant Examiner* — Omer Khalid
(74) *Attorney, Agent, or Firm* — McDermott Will & Emery LLP

(57) ABSTRACT

The content processing device includes a first converter for performing first conversion processing of converting frame rates of the first content and the second content, which are moving images, so that the frame rates become equal to each other, a synthesizer for performing screen synthesis for displaying side by side the conversion results on the same screen, a second converter for performing a second conversion processing of converting the frame rate of the synthesis result to a frame rate higher than the frame rate before being converted, a storage unit for temporarily storing the frames required for the first conversion processing and the second conversion processing, and a controller for calculating a ratio of storage capacities of the storage unit to be assigned to the first conversion processing and the second conversion processing according to attributes related to motion amounts of moving images.

8 Claims, 11 Drawing Sheets

(56) References Cited

U.S. PATENT DOCUMENTS

2008/0055470 A1* 3/2008 Garg ................. H04N 5/45
                                                                                  348/564
2014/0204272 A1* 7/2014 Yang ................. H04N 5/45
                                                                                  348/565

* cited by examiner

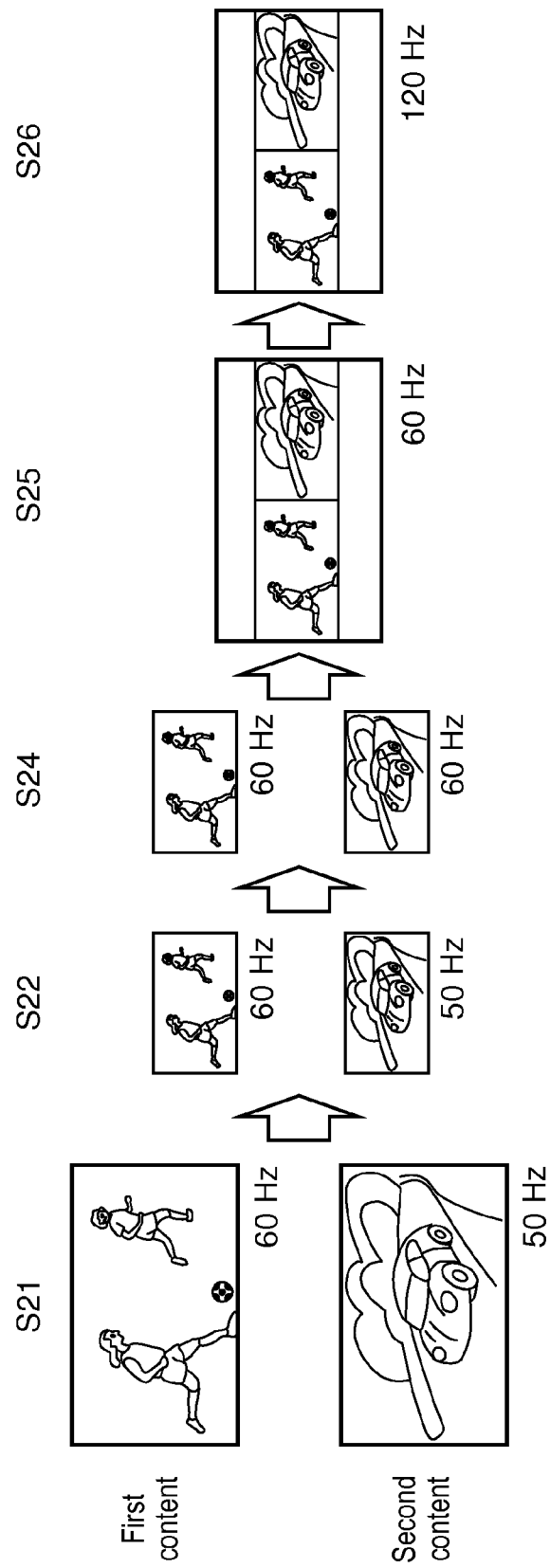

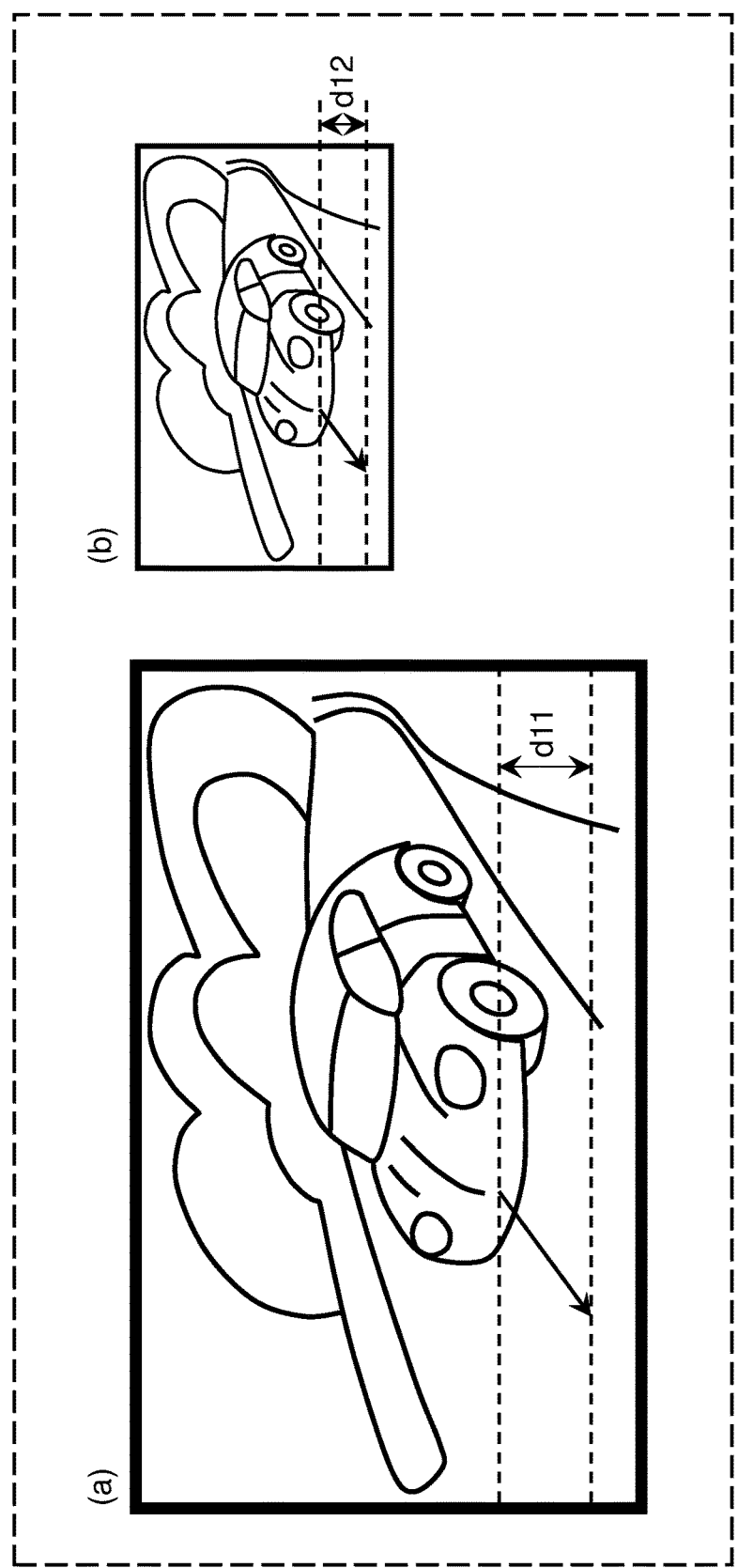

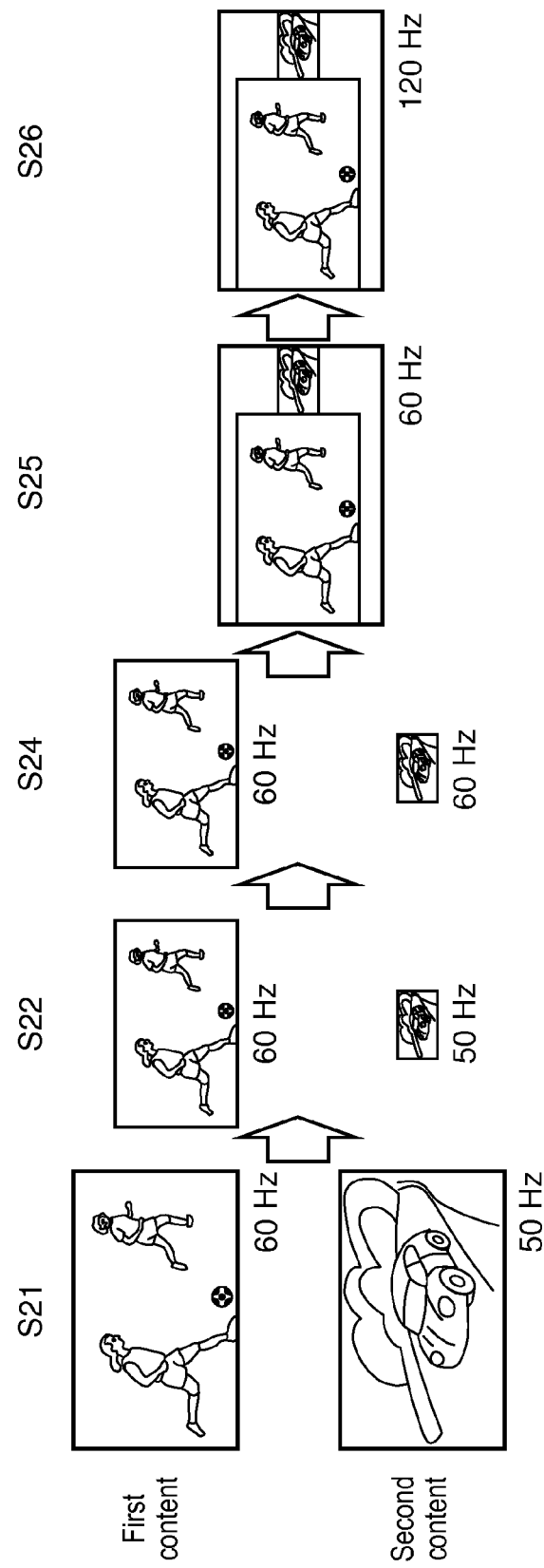

FIG. 6A
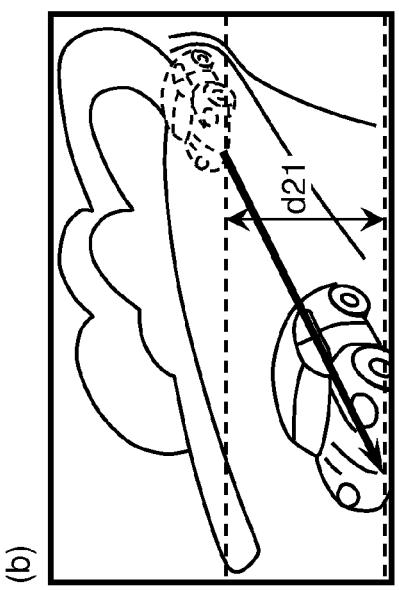
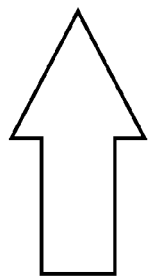
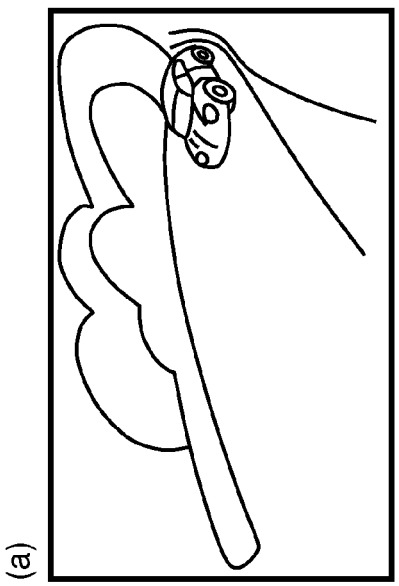

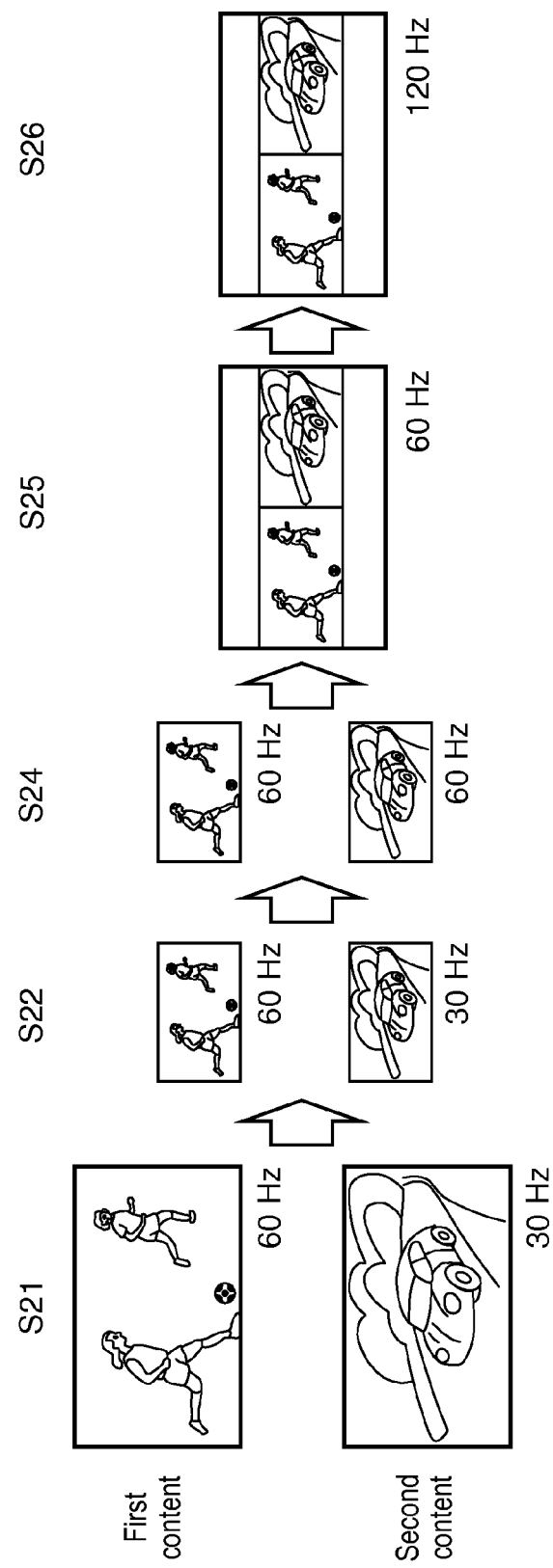

CONTENT PROCESSING DEVICE AND CONTENT PROCESSING METHOD

RELATED APPLICATIONS

This application claims the benefit of Japanese Application No. 2014-068181, filed on Mar. 28, 2014 and Japanese Application No. 2015-019338, filed on Feb. 3, 2015, the disclosures of which Applications are incorporated by reference herein.

BACKGROUND

1. Field

The present disclosure relates to a content processing device and a content processing method.

2. Description of the Related Art

Unexamined Japanese Patent Publication No. 2009-111936 disclosed that, when a plurality of video signals different in frame rates are input and these images are displayed side by side on the same screen, motion-compensated frame rate conversion processing is performed for any one of the video signals so that the frame rate of one of the video signals becomes equal to the frame rate of the other video signal.

SUMMARY

The content processing device of the present disclosure includes a first input unit into which a first content being a moving image including a plurality of consecutive frames is input, a second input unit into which a second content being a moving image including a plurality of consecutive frames, and being different from the first content in frame rate is input, a first adjuster configured to adjust a frame size by enlarging or reducing the first content, and to output a first adjustment result being a result of adjustment, a second adjuster configured to adjust a frame size by enlarging or reducing the second content, and to output a second adjustment result being a result of adjustment, a first converter configured to perform first conversion processing of converting frame rates of the first adjustment result and the second adjustment result so that the frame rates become equal to each other, and to output respective results of the first conversion processing as a first conversion result and a second conversion result, a synthesizer configured to perform a screen synthesis for displaying the first conversion result and the second conversion result side by side on a same screen, and to output a synthesis result being a result of the screen synthesis, a second converter configured to perform second conversion processing of converting a frame rate of the synthesis result to a frame rate higher than the frame rate before being converted, a storage unit configured to temporarily store frames required for the first conversion processing and the second conversion processing during the first conversion processing and the second conversion processing, and controller configured to calculate a ratio of storage capacities of the storage unit to be assigned to the first conversion processing and the second conversion processing in accordance with attributes related to motion amounts of moving images of the first adjustment result and the second adjustment result, and to perform control of assigning the storage capacities corresponding to the ratio to the first conversion processing and the second conversion processing, wherein the first converter and the second converter respectively perform the first conversion processing and the second conversion processing using the respective storage capacities assigned by the controller.

BRIEF DESCRIPTION OF DRAWINGS

FIG. 3 is a diagram for illustrating a first example of the operation of the content processing device according to the exemplary embodiment;

FIG. 4 is a diagram for illustrating a magnitude of a motion compensation range in frame rate conversion processing;

FIG. 5 is a diagram for illustrating a second example and a fourth example of the operation of the content processing device according to the exemplary embodiment;

FIG. 6A is a diagram for illustrating the magnitude of the motion compensation range in the frame rate conversion processing;

FIG. 7 is a diagram for illustrating a third example of the operation of the content processing device according to the exemplary embodiment;

DETAILED DESCRIPTION

In the following, exemplary embodiment will be described in detail with reference to the accompanying drawings appropriately. However, a detailed description more than necessary may be omitted. For example, a detailed description of the already well-known matters and an overlapping description of substantially the same configuration may be omitted. This is to avoid that the following description is unnecessarily redundant, and to facilitate the understanding of those skilled in the art.

It should be noted that the present inventor(s) provide the accompanying drawings and the description below so that those skilled in the art fully understand the present disclosure, and do not intend to limit the subject matter described in the claims by these.

Exemplary Embodiment

1-1. Configuration

Figure 1:
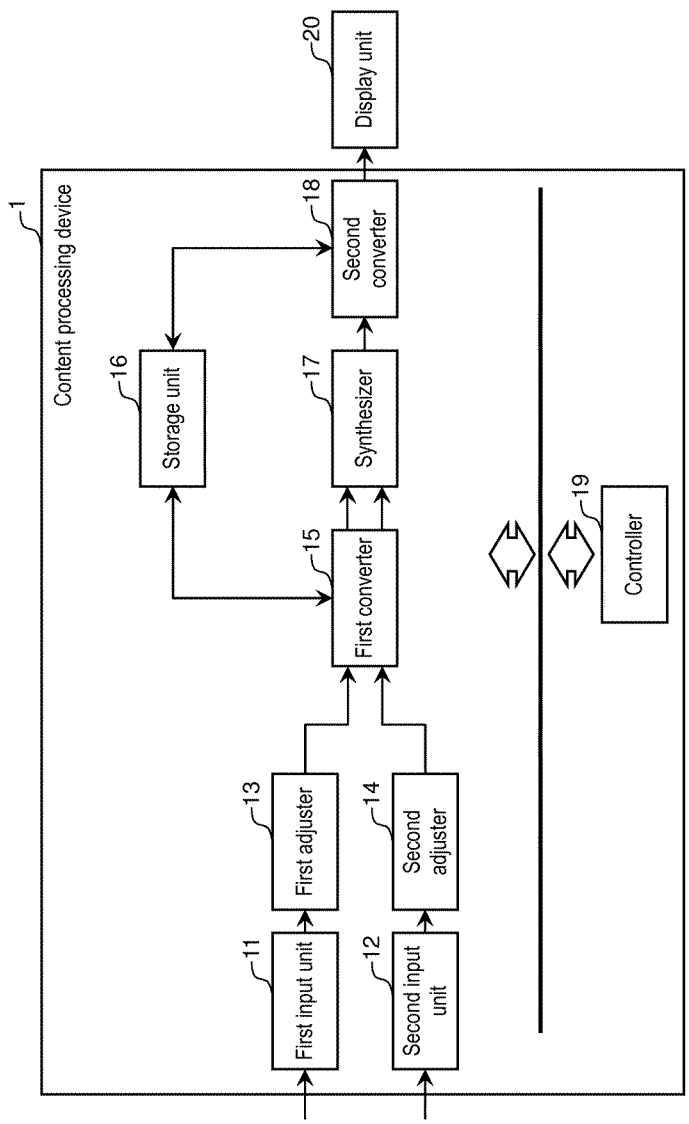
FIG. 1 is a block diagram illustrating a configuration of a content processing device according to an exemplary embodiment.

FIG. 1 is a block diagram illustrating a configuration of a content processing device according to the exemplary embodiment.

In FIG. 1, content processing device 1 includes first input unit 11, second input unit 12, first adjuster 13, second adjuster 14, first converter 15, storage unit 16, synthesizer 17, second converter 18, and controller 19. The processing result of content processing device 1 is output to display unit 20 connected outside content processing device 1. Content processing device 1 is mounted on, for example, a TV (Television), a video recorder, and the like, and is implemented by, for example, a processor and a storage device storing a program. In addition, content processing device 1 may be implemented by an integrated circuit. That is, content processing device 1 may be implemented by software, and may be implemented by hardware.

Into first input unit 11, the content including a plurality of consecutive frames, being a moving image (hereinafter referred to as "first content") is input. First input unit 11 outputs the input first content to first adjuster 13. In addition, first input unit 11 detects the frame size and the frame rate of the first content, and outputs the detected frame size and frame rate to controller 19.

Into second input unit 12, the content being a moving image including a plurality of consecutive frames, different from the first content in frame rate (hereinafter referred to as "second content") is input. Second input unit 12 outputs the second content to second adjuster 14. Second input unit 12 detects the frame size and the frame rate of the second content, and outputs the detected frame size and frame rate to controller 19.

First adjuster 13 adjusts the frame size to the screen size of display unit 20 by enlarging or reducing the first content received from first input unit 11, and outputs the first adjustment result being the result of the adjustment to first converter 15.

Second adjuster 14 adjusts the frame size to the screen size of display unit 20 by enlarging or reducing the second content received from second input unit 12, and outputs the second adjustment result being the result of the adjustment to first converter 15.

It should be noted that when a plurality of moving images are displayed side by side on the screen of display unit 20, first adjuster 13 and second adjuster 14 may adjust the frame sizes in accordance with the sizes which are set in advance, or may adjust the frame sizes in accordance with the sizes specified by the user.

First converter 15 performs the processing of converting the frame rates (hereinafter referred to as "first conversion processing") of the first adjustment result and the second adjustment result so that the frame rates become equal to each other, and outputs the respective results of the first conversion processing to synthesizer 17 as the first conversion result and the second conversion result. Specifically, first converter 15 selects an adjustment result (content) having a lower frame rate from the first adjustment result received from first adjuster 13 and the second adjustment result received from second adjuster 14, and converts the frame rate of the selected adjustment result (content) so as to be equal to the frame rate of the non-selected adjustment result (content). That is, first converter 15 performs the first conversion processing which applies a processing of converting the frame rate of one adjustment result, and does not apply a processing of converting the frame rate of the other adjustment result of the two adjustment results.

In addition, when selecting the adjustment result having a lower frame rate, first converter 15 compares the frame rate of the first adjustment result and the frame rate of the second adjustment result to select by using the result of the comparison. For example, when the frame rate of the first adjustment result is 60 Hz, and the frame rate of the second adjustment result is 50 Hz, first converter 15 selects the second adjustment result, and performs the processing of converting the frame rate of the second adjustment result. It should be noted that regardless of the above, first converter 15 may select an adjustment result having a higher frame rate of the first adjustment result and the second adjustment result, and may output the selected adjustment result to synthesizer 17.

During the first conversion processing and the second conversion processing described below, storage unit 16 temporarily stores the frames required for the first conversion processing and the second conversion processing. It should be noted that without limited to storing the entire area of the frames required for the first conversion processing and the second conversion, storage unit 16 may temporarily store part of the area of the frames. Storage unit 16 is implemented by, for example, a cache memory used when the motion-compensated frame rate conversion processing is performed.

Synthesizer 17 performs the screen synthesis for displaying side by side the first conversion result and the second conversion result received from first converter 15 on the same screen, and outputs the synthesis result being a result of the screen synthesis to second converter 18. It should be noted that the screen synthesis is the processing of synthesizing one moving image by arranging the first conversion result and the second conversion result on the same screen without overlapping.

Second converter 18 performs a second conversion processing of converting the frame rate of the synthesis result received from synthesizer 17 to a frame rate higher than the frame rate of the synthesis before being converted. Second converter 18 increases, for example, the frame rate of the synthesis result X times (X is an arbitrary integer, such as 2, 3, and 4) so as to match the display frequency to which display unit 20 corresponds, and outputs the result to display unit 20.

Display unit 20 displays the content of the result of the second conversion processing being performed, which is received from second converter 18. Display unit 20 is implemented by, for example, a LCD display, an organic EL (Electroluminescence) display, and the like.

Controller 19 controls each unit of content processing device 1. More specifically, controller 19 controls first adjuster 13 and second adjuster 14 so that first adjuster 13 and second adjuster 14 enlarge or reduce the frame sizes of the first content and the second content to be adjusted to the screen size of display unit 20, so that first content being input into first input unit 11 and second content input being into second input unit 12 fit on the screen of display unit 20. Controller 19 selects an adjustment result having a lower frame rate of the first adjustment result and the second adjustment result, and controls first converter 15 so that first converter 15 performs the conversion by which the frame rate of the selected adjustment result becomes equal to the frame rate of the non-selected adjustment result (content).

Controller 19 calculates the ratio of storage capacities of storage unit 16 to be assigned to the first conversion processing and the second conversion processing in accordance with the attributes related to the motion amounts of the moving images of the first adjustment result and the second adjustment result, and performs the control of assigning the storage capacities corresponding to the ratio to the first conversion processing and the second conversion processing. Here, the attribute is at least one of the frame size and the frame rate. In addition, the motion amount is, for example, the amount showing in pixel unit the movement of the image in unit time.

Moreover, controller 19 controls synthesizer 17 so that synthesizer 17 performs the screen synthesis for displaying side by side the first conversion result and the second conversion result received from first converter 15 on the same screen. Controller 19 controls second converter 18 so that second converter 18 performs the second conversion processing of converting the frame rate of the synthesis result received from synthesizer 17 to a frame rate higher than the frame rate before being converted. Controller 19 controls display unit 20 so that display unit 20 displays the resultant content which is subjected to second conversion processing and sent from second converter 18.

It should be noted that there is motion-compensated frame rate conversion processing as an example of a frame rate conversion processing in the present exemplary embodiment. In motion-compensated frame rate conversion processing, first, among a plurality of consecutive frames, the motion vector of the target image is detected from, for example, the two frames, and an interpolation pixel is generated using the pixel data of the two frames that are present on a straight line indicated by the detected motion vector. Then, the generation of this interpolation pixel is performed on all the pixels constituting an interpolation frame to be generated between the two frames, whereby the interpolation frame being a new frame is generated. For example, the frame rate of the content including a plurality of consecutive frames can be converted from 50 Hz to 60 Hz by the four frames among five consecutive frames being replaced with the five interpolation frames.

1-2. Operation

On the content processing device 1 configured as described above, the operation will be described below.

Figure 2:
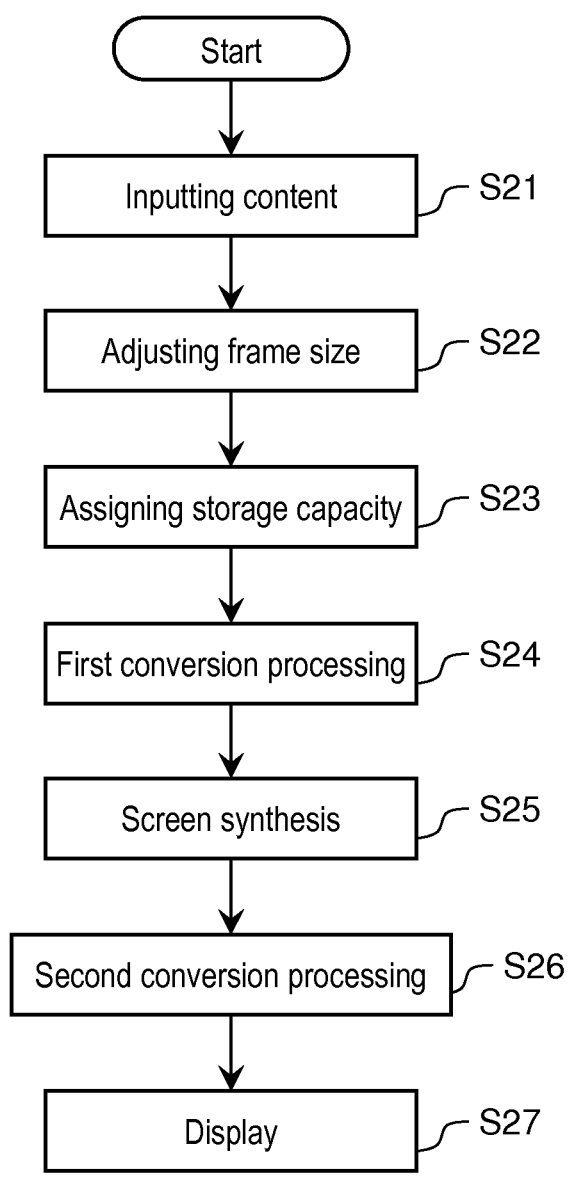
FIG. 2 is a flowchart for illustrating an operation of the content processing device according to the exemplary embodiment.

FIG. 2 is a flowchart for illustrating the operation of the content processing device according to the exemplary embodiment.

In the following, the control by controller 19 is performed, whereby, each step is executed by the corresponding unit.

First, the first content and the second content are respectively input into first input unit 11 and second input unit 12 (S21). In step S21, specifically, the following processing is performed. The first content that is a moving image including a plurality of consecutive frames is input into first input unit 11. First input unit 11 outputs the first content to first adjuster 13. In addition, in this case, first input unit 11 detects the frame size and the frame rate of the first content, and outputs the detected frame size and frame rate to controller 19. The second content that is a moving image including a plurality of consecutive frames, and being different from the first content in frame rate, is input into second input unit 12. Second input unit 12 outputs the second content to second adjuster 14. In addition, second input unit 12 detects the frame size and the frame rate of the second content, and outputs the detected frame size and frame rate to controller 19.

Next, first adjuster 13 adjusts the frame size of the received first content, and second adjuster 14 adjusts the frame size of the received second content (S22). In step S22, specifically, the following processing is performed. First adjuster 13 adjusts the frame size to the screen size of display unit 20 by enlarging or reducing the first content received from first input unit 11, and outputs the first adjustment result being the result of the adjustment to first converter 15. In addition, second adjuster 14 adjusts the frame size to the screen size of display unit 20 by enlarging or reducing the second content received from second input unit 12, and outputs the second adjustment result being the result of the adjustment to first converter 15.

Next, controller 19 calculates the ratio of storage capacities of storage unit 16 to be assigned to the first conversion processing and the second conversion processing, in accordance with the attributes related to the motion amount of the moving image of the first adjustment result and the second adjustment result, and performs the control of assigning the storage capacities corresponding to the ratio to the first conversion processing and the second conversion processing (S23).

Next, first converter 15 performs the first conversion processing of converting the frame rates of the first adjustment result and the second adjustment result so that the frame rates become equal to each other, and outputs the respective results of the first conversion processing to synthesizer 17 as the first conversion result and the second conversion result (S24). In this case, first converter 15 performs the first conversion processing using the storage capacity assigned in step S23.

Next, synthesizer 17 performs the screen synthesis for displaying side by side the first conversion result and the second conversion result on the same screen, and outputs the synthesis result being the result of the screen synthesis (S25).

Next, second converter 18 performs the second conversion processing of increasing the frame rate of the synthesis result received from synthesizer 17 X times (X is an arbitrary integer, such as 2, 3, and 4) to match, for example, the display frequency to which display unit 20 corresponds, and outputs the result to display unit 20 (S26). In this case, second converter 18 performs the second conversion processing using the storage capacity assigned in step S23.

Lastly, display unit 20 displays the resultant content which is subjected to the second conversion processing, and is received from second converter 18 (S27).

FIG. 3 is a diagram for illustrating a first example of the operation of the content processing device according to the exemplary embodiment.

The first example shown in FIG. 3 is an example where a moving image having the frame size of 1920×1080 pixels and the frame rate of 60 Hz is input as the first content, and a moving image having the frame size of 1920×1080 pixels and the frame rate of 50 Hz as the second content. In addition, the first example is an example where the frame sizes are adjusted so as to be 960×540 pixels, and a frame rate conversion processing is performed so that the frame rates are displayed at 120 Hz on the same screen, on the first content and the second content.

In this case, in step S21, the following processing is performed. A moving image having the frame size of 1920× 1080 pixels and the frame rate of 60 Hz is input into first input unit 11 as the first content. In addition, a moving image having the frame size of 1920×1080 pixels and the frame rate of 50 Hz is input into second input unit 12 as the second content. First input unit 11 and second input unit 12 detect respectively the frame size and the frame rates of the first contents and the second content, and output respectively the detected frame sizes and the detected frame rates of the first content and the second content to controller 19.

In step S22, the following processing is performed. First adjuster 13 reduces the first content received from first input unit 11 to be adjusted to the screen size of display unit 20 so that the frame size becomes 960×560 pixels, and outputs the first adjustment result being the result of the reduction to first converter 15. Second adjuster 14 reduces the second content received from second input unit 12 to be adjusted to the screen size of display unit 20 so that the frame size becomes 960×560 pixels, and outputs the second adjustment result being the result of the reduction to first converter 15.

In step S23, the following processing is performed. As for the ratio, controller 19 performs the control to calculate the ratio of the frame size of the second adjustment result to the larger frame size of the first adjustment result and the second adjustment result, and to assign the storage capacities corresponding to the ratio to the first conversion processing and the second conversion processing. That is, controller 19 calculates the ratio of the 960×560 pixels, which is the frame size of the second adjustment result on which a frame rate conversion processing is actually performed in the first conversion processing, to the 960×560 pixels, which is the larger frame size of the first adjustment result and the second adjustment result. It should be noted that when the ratio of the frame sizes are calculated, the ratio may be calculated using the number of pixels in the vertical direction, the ratio may be calculated using the number of pixels in the horizontal direction, the ratio may be calculated using the larger number of pixels of the number of pixels in the vertical direction and the number of pixels in the horizontal direction, or the ratio may be calculated using the square root of the total number of pixels in the frame (the product of the number of pixels in the horizontal direction and the number of pixels in the vertical direction). In this case, controller 19 calculates a one-to-one ratio, and if the storage capacity of storage unit 16 is set to "100", controller 19 assigns the storage capacity of "50" to the first conversion processing in first converter 15, and assigns the storage capacity of "50" to the second conversion processing in second converter 18, based on the calculated one-to-one ratio.

In step S24, first converter 15 performs the first conversion processing using the storage capacity of "50" assigned by controller 19. Specifically, first converter 15 performs the processing of converting the second adjustment result so that the frame rate (50 Hz) of the second adjustment result becomes equal to the frame rate (60 Hz) of the first adjustment result as the first conversion processing.

In step S25, synthesizer 17 performs the screen synthesis for displaying side by side the first conversion result and the second conversion result on the same screen, and outputs the synthesis result being the result of the screen synthesis to second converter 18. Specifically, synthesizer 17 generates a moving image having the frame size of 1920×1080 pixels and the frame rate of 60 Hz, by synthesizing side by side the first conversion result having the frame size of 960×560 pixels and the frame rate of 60 Hz, and the second conversion result having the frame size of 960×560 pixels and the frame rate of 60 Hz, in the horizontal direction.

In step S26, second converter 18 performs the second conversion processing using the storage capacity of "50" assigned by controller 19. Specifically, second converter 18 performs the second conversion processing of doubling the frame rate of the synthesis result received from synthesizer 17 from 60 Hz to 120 Hz, and outputs the result to display unit 20.

In the exemplary embodiment of the present disclosure, when the storage capacity of the cache memory required in each of the first conversion processing and the second conversion processing are shared by using one storage unit 16, it is characterized in that the storage capacities are appropriately distributed to the first conversion processing and the second conversion processing. In general, when the storage capacity used for the frame rate conversion processing is reduced, the motion compensation range in the frame rate conversion processing (to what extent the movement speed of the object can be followed) becomes smaller in proportion to the storage capacity.

FIG. 4 is a diagram for illustrating the magnitude of the motion compensation range in the frame rate conversion processing. Specifically, FIG. 4(a) shows a moving image having the frame size of 1920×1080 pixels. In addition, FIG. 4(b) is a moving image having the same content as FIG. 4(a), and shows a moving image having the frame size of 960×540 pixels. That is, the moving image shown in FIG. 4(b) is a moving image whose frame size is reduced in the vertical and the horizontal directions to half the frame size of the moving image shown in FIG. 4(a).

As shown in FIG. 4(a), the vehicle is expected to move by the motion vector indicated by the arrow, and in this case, the motion compensation range of only width d11 in the vertical direction is required. That is, in the case of FIG. 4(a), it is necessary to temporarily store (cache) the number of pixels only for width d11 in the frame rate conversion processing. On the other hand, in the case of FIG. 4(b), the vehicle is expected to move by the motion vector indicated by the arrow in the same manner as in FIG. 4(a), and in this case, it is necessary to temporarily store the number of pixels only for width d12 in the vertical direction in the frame rate conversion processing. Based on the above, it is understood that the ratio of the storage capacity of the cache memory required for performing the frame rate conversion processing on the moving image in FIG. 4(a), to the storage capacity of the cache memory required for performing the frame rate conversion processing on the moving image in FIG. 4(b) is equal to the ratio of width d11 to width d12.

In this case, FIG. 4(a) and FIG. 4(b) have the same frame of the same content, and therefore, the arrow in FIG. 4(a) and the arrow in FIG. 4(b) have the ratio of the length of two-to-one. That is, width d11 is twice width d12. As a result, it is understood that the storage capacity of the cache memory required for performing the frame rate conversion processing on the moving image in FIG. 4(a), and the storage capacity of the cache memory required for performing the frame rate conversion processing on the moving image in FIG. 4(b) have two-to-one relation. That is, it is understood that the storage capacity of the cache memory required for performing the frame rate conversion processing can be determined in accordance with to the frame size of the moving image to be the target for the frame rate conversion processing.

In the example shown in FIG. 3, the frame size of the second adjustment result on which the frame rate conversion processing is actually performed in the first conversion processing performed in first converter 15 is 960×540 pixels, and is the number of pixels half in each of the horizontal and vertical directions of 1920×1080 pixels being the frame size of the second content that is input into second input unit 12. In addition, the movement speed of the target image in the second adjustment result is also half in each of the horizontal and vertical directions when the 1920×1080 pixels being the frame size of the input second content is set as the reference. Therefore, the storage capacity required for the frame rate conversion processing of the second adjustment result is sufficient with half of the storage capacity required for the frame rate conversion processing of the second content. In other words, it can be said that the motion compensation performance of when the storage capacity used for the frame rate conversion processing on the moving image having the frame size of 960×540 pixels is set to half of the total storage capacity usable for the frame rate conversion processing, is equivalent to the motion compensation performance of when the storage capacity used for the frame rate conversion processing on the moving image having the frame size of 1920×1080 pixels is set to one (that is, the total storage capacity), without being reduced.

In addition, although the frame size of the content on which the frame rate conversion processing is performed in second converter 18 is 1920×1080 pixels, each of the frame sizes of the two pieces of content included in the content is 960×540 pixels. Thus, it can be said that even if the storage capacity required for the frame rate conversion processing in second converter 18 is set to half of the total storage capacity, the motion compensation performance does not decrease.

FIG. 5 is a diagram for illustrating the second example and the fourth example (see below) of the operation of the content processing device according to the exemplary embodiment.

The second example shown in FIG. 5 is an example where the moving image having the frame size of 1920×1080 pixels and the frame rate of 60 Hz is input as the first content, and the moving image having the frame size of 1920×1080 pixels and the frame rate of 50 Hz is input as the second content. In addition, the second example is an example where the adjustment of the frame size is performed on the first content so that the frame size becomes 1440×810 pixels, the adjustment of the frame size is performed on the second content so that the frame size becomes 480×270 pixels, and the frame rate conversion processing is performed on the two moving images on which the adjustments of these frame sizes are performed so that the frame rates are displayed at 120 Hz on the same screen.

In this case, in step S21, the following processing is performed. The moving image having the frame size of 1920×1080 pixels and the frame rate of 60 Hz is input into first input unit 11 as the first content. In addition, the moving image having the frame size of 1920×1080 pixels and the frame rate of 50 Hz is input into second input unit 12 as the second content. First input unit 11 and second input unit 12 detect respectively the frame sizes and the frame rates of the first content and the second content, and output respectively the detected frame sizes and the detected frame rates of the first content and the second content to controller 19.

In step S22, the following processing is performed. First adjuster 13 reduces the first content received from first input unit 11 to be adjusted to the screen size of display unit 20 so that the frame size becomes 1440×810 pixels, and outputs the first adjustment result being the result of the reduction to first converter 15. Second adjuster 14 reduces the second content received from second input unit 12 to be adjusted to the screen size of display unit 20 so that the frame size becomes 480×270 pixels, and outputs the second adjustment result being the result of the reduction to first converter 15.

In step S23, the following processing is performed. As for the ratio, controller 19 performs the control to calculate the ratio of the frame size of the second adjustment result to the larger frame size of the first adjustment result and the second adjustment result, and to assign the storage capacities corresponding to the ratio to the first conversion processing and the second conversion processing. That is, controller 19 calculates the ratio of the 480×270 pixels, which is the frame size of the second adjustment result on which a frame rate conversion processing is actually performed in the first conversion processing, to the 1440×810 pixels, which is the larger frame size of the first adjustment result and the second adjustment result. In this case, controller 19 calculates a one-to-three ratio, and if the storage capacity of storage unit 16 is set to "100", controller 19 assigns the storage capacity of "25" to the first conversion processing in first converter 15, and assigns the storage capacity of "75" to the second conversion processing in second converter 18, in accordance with the calculated one-to-three ratio.

In step S24, first converter 15 performs the first conversion processing using the storage capacity of "25" assigned by controller 19. Specifically, first converter 15 performs the processing of converting the second adjustment result so that the frame rate (50 Hz) of the second adjustment result becomes equal to the frame rate (60 Hz) of the first adjustment result as the first conversion processing.

In step S25, synthesizer 17 performs the screen synthesis for displaying side by side the first conversion result and the second conversion result on the same screen, and outputs the synthesis result being the result of the screen synthesis to second converter 18. Specifically, synthesizer 17 generates a moving image having the frame size of 1920×1080 pixels and the frame rate of 60 Hz, by synthesizing side by side the first conversion result having the frame size of 1440×810 pixels and the frame rate of 60 Hz, and the second conversion result having the frame size of 480×270 pixels and the frame rate of 60 Hz, in the horizontal direction.

In step S26, second converter 18 performs the second conversion processing using the storage capacity of "75" assigned by controller 19. Specifically, second converter 18 performs the second conversion processing of doubling the frame rate of the synthesis result received from synthesizer 17 from 60 Hz to 120 Hz, and outputs the result to display unit 20.

In the exemplary embodiment of the present disclosure, when the storage capacities of the cache memory required in the first conversion processing and the second conversion processing are shared by using one storage unit 16, it is characterized in that the storage capacities are appropriately distributed to the first conversion processing and the second conversion processing. In general, when the storage capacity used for the frame rate conversion processing is reduced, the motion compensation range in the frame rate conversion processing (to what extent the movement speed of the object can be followed) becomes smaller in proportion to the storage capacity.

In the example shown in FIG. 5, the frame size of the second adjustment result on which the frame rate conversion processing is actually performed in the first conversion processing performed in first converter 15 is 480×270 pixels, and is the number of pixels a quarter in each of the horizontal and vertical directions of 1920×1080 pixels being the frame size of the second content that is input into second input unit 12. In addition, the movement speed of the target image in the second adjustment result is also a quarter in each of the horizontal and vertical directions when the 1920×1080 pixels being the frame size of the input second content is set as the reference. Therefore, the storage capacity required for the frame rate conversion processing of the second adjustment result is sufficient with a quarter of the storage capacity required for the frame rate conversion processing of the second content. In other words, it can be said that the motion compensation performance of when the storage capacity used for the frame rate conversion processing on the moving image having the frame size of 480×270 pixels is set to a quarter of the total storage capacity usable for the frame rate conversion processing, is equivalent to the motion compensation performance of when the storage capacity used for the frame rate conversion processing on the moving image having the frame size of 1920×1080 pixels is set to one (that is, the total storage capacity), without being reduced.

In addition, although the frame size of the content on which the frame rate conversion processing is performed in second converter 18 is 1920×1080 pixels, the respective frame sizes of the two pieces of content included in the content are 1440×810 pixels and 480×270 pixels, and therefore, it can be said that the motion compensation performance does not decrease even if the storage capacity required for the frame rate conversion processing is set to three quarters of the total storage capacity. That is, even if the storage capacity to be used in the first conversion processing is set to a quarter, and the storage capacity to be used in the second conversion processing is set to three quarters, the first conversion processing and the second conversion processing can be performed without lowering the motion compensation performance. Therefore, efficient frame rate conversion processing can be performed using a limited storage capacity.

1-3. Effect, Etc.

As described above, in the present exemplary embodiment, content processing device 1 includes first input unit 11, second input unit 12, first adjuster 13, second adjuster 14, first converter 15, storage unit 16, synthesizer 17, second converter 18, and controller 19.

The first content being a moving image including a plurality of consecutive frames is input into first input unit 11. The second content being moving image including a plurality of consecutive frames, and being different from the first content in frame rate, is input into second input unit 12. First adjuster 13 adjusts the frame size by enlarging or reducing the first content, and outputs the first adjustment result being a result of the adjustment. Second adjuster 14 adjusts the frame size by enlarging or reducing the second content, and outputs the second adjustment result being a result of the adjustment. First converter 15 performs the first conversion processing of converting the frame rates of the first adjustment result and the second adjustment result so that the frame rates become equal to each other, and outputs the respective results of the first conversion processing as the first conversion result and the second conversion result. Synthesizer 17 performs the screen synthesis for displaying side by side the first conversion result and the second conversion result on the same screen, and outputs the synthesis result being the result of the screen synthesis. Second converter 18 performs the second conversion processing of converting the frame rate of the synthesis result to a frame rate higher than the frame rate before being converted. Storage unit 16 temporarily stores the frames required for the first conversion processing and the second conversion processing during the first conversion processing and the second conversion processing. Controller 19 calculates the ratio of storage capacities of storage unit 16 to be assigned to the first conversion processing and the second conversion processing, in accordance with the attributes related to the motion amount of the moving image of the first adjustment result and the second adjustment result, and performs the control of assigning the storage capacities corresponding to the ratio to the first conversion processing and the second conversion processing. First converter 15 and second converter 18 perform respectively the first conversion processing and the second conversion processing using the storage capacities assigned by controller 19.

Accordingly, even when a plurality of pieces of content are displayed side by side on the same screen simultaneously, the storage capacity of storage unit 16 can be properly assigned to the first conversion processing and the second conversion processing in accordance with the attributes related to the motion amount of the moving images of the first adjustment result and the second adjustment result, and therefore, the storage capacity of storage unit 16 can be reduced as much as possible. Thus, the content processing device that minimizes the storage capacity of storage unit 16 can be achieved, and therefore, a high-quality content display with a reduced judder while the increase in cost is being reduced is made possible.

First Modification

In the above exemplary embodiment, controller 19 controls the storage capacity of storage unit 16 to be assigned to each of the first conversion processing and the second conversion processing (that is, the frame size is used as the attributes related to the motion amount of the moving image), depending on the frame sizes of the first adjustment result and the second adjustment result obtained from the respective frame sizes adjusted in first adjuster 13 and second adjuster 14, but is not limited to this. Controller 19 may control the storage capacity of storage unit 16 to be assigned to the first conversion processing and the second conversion processing, depending on the frame rates of the first adjustment result and the second adjustment result obtained from the respective frame sizes adjusted in first adjuster 13 and second adjuster 14. That is, the frame rate may be used as the attribute related to the motion amount of the moving image. In the following, the control of the storage capacity of storage unit 16 to be assigned to the first conversion processing and the second conversion processing by using the frame rate will be described.

Figure 6B:
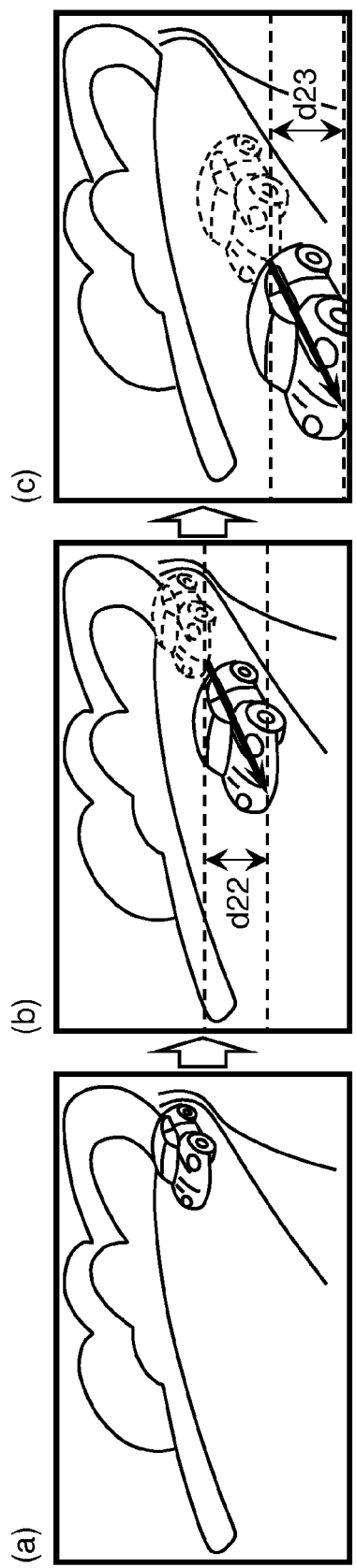
FIG. 6B is a diagram for illustrating the magnitude of the motion compensation range in the frame rate conversion processing.

FIGS. 6A and 6B are diagrams for illustrating the magnitude of the motion compensation range in the frame rate conversion processing. FIG. 7 is a diagram for illustrating the third example of the operation of the content processing device according to the first modification of the exemplary embodiment.

For example, the case of converting a moving image having the frame rate of 30 Hz to that having the frame rate of 60 Hz, and the case of converting a moving image having the frame rate of 60 Hz to that having the frame rate of 120 Hz, will be compared. Here, it is assumed that FIG. 6A shows a moving image having the frame rate of 30 Hz, and FIG. 6B shows a moving image having the frame rate of 60 Hz. In addition, (a) and (b) in FIG. 6A show the two adjacent frames, and similarly, (a), (b), and (c) in FIG. 6B show the three adjacent frames. Furthermore, (a) in FIG. 6A and (a) in FIG. 6B show the frames at the same timing of the same moving image, and similarly, (b) in FIG. 6A and (c) in FIG. 6B show the frames at the same timing of the same moving image.

When the frame rate is 30 Hz, the amount of movement of the object between the two adjacent frames is the distance that the vehicle moves from (a) to (b) in FIG. 6A (the size of the vector indicated by the arrow), and it is necessary to temporarily store (cache) the number of pixels only for width d21 in the vertical direction in the frame rate conversion processing. On the other hand, when the frame rate is 60 Hz, the amount of movement of the object between the two adjacent frames is the distance that the vehicle moves from (a) to (b) in FIG. 6B or from (b) to (c) in FIG. 6B (the size of the vector indicated by the arrow), and it is necessary to temporarily store (cache) the number of pixels only for width d22 or width d23 in the vertical direction in the frame rate conversion processing.

Here, in FIG. 6B, (b) is a frame adjacent between (a) and (c), and therefore, the time from (a) to (c), and the time from (a) to (b) or the time from (b) to (c) have the two-to-one relation. That is, when it is assumed that the vehicle moves at a constant speed, the size of the arrow shown in (b) of FIG. 6A is twice the size of the arrow shown in (b) of FIG. 6B, or twice the size of the arrow shown in (c) of FIG. 6B. As a result, it is understood that width d21 is twice the width of width d22 or width d23. Therefore, it is understood that the storage capacity of the cache memory required when the first frame rate conversion processing is performed on the moving image in FIG. 6A, and the storage capacity of the cache memory required for performing the frame rate conversion processing on the moving image in FIG. 6B, have a two-to-one ratio. The ratio of two-to-one is the same as the ratio represented by the time between adjacent frames, and therefore, it is understood that the storage capacity of cache memory required for performing the frame rate conversion processing can be determined in accordance with the frame rate of the moving image to be the target on which the frame rate conversion processing is performed.

The third example shown in FIG. 7 is an example where a moving image having the frame size of 1920×1080 pixels and the frame rate of 60 Hz is input as the first content, and a moving image having the frame size of 1920×1080 pixels and the frame rate of 30 Hz is input as the second content. In addition, the third example is an example where the adjustment of the frame sizes are performed on the first content and the second content so that the frame sizes become 960×540 pixels, and the frame rate conversion processing is performed so that the first content and the second content are displayed at the frame rates of 120 Hz on the same screen.

In this case, in step S21 and step S22, the same processing as the processing for the first example in FIG. 3 is performed.

Then, in step S23, the following processing is performed. As for the ratio, controller 19 calculates the ratio of the reciprocal of the first frame rate of the first adjustment result to the reciprocal of the frame rate of the synthesis result. That is, controller 19 calculates the ratio of the reciprocal of 30 Hz, being the frame rate of the second adjustment result on which the frame rate conversion processing is actually performed in the first conversion processing, to the reciprocal of 60 Hz, being the frame rate of the synthesis result. Here, it is apparent that the target value of the frame rate after the second conversion processing and the synthesis is 60 Hz even if the synthesis result is not generated, therefore, the frame rate of the synthesis result may use the frame rate of 60 Hz as the target value. As a result, controller 19 calculates two-to-one as the ratio. When the storage capacity of storage unit 16 is set to "100", controller 19 assigns the storage capacity of "66" to the first conversion processing in first converter 15, and assigns the storage capacity of "33" to the second conversion processing in second converter 18, based on the calculated two-to-one ratio.

In step S24, first converter 15 performs the first conversion processing using the storage capacity of "66" assigned by controller 19. Specifically, first converter 15 performs the processing of converting the second adjustment result so that the frame rate (30 Hz) of the second adjustment result becomes equal to the frame rate (60 Hz) of the first adjustment result as the first conversion processing.

In step S25, the same processing as the processing for the first example in FIG. 3 is performed.

In step S26, second converter 18 performs the second conversion processing using the storage capacity of "33" assigned by controller 19. Specifically, second converter 18 performs the second conversion processing of doubling the frame rate of the synthesis result received from synthesizer 17 from 60 Hz to 120 Hz, and outputs the result to display unit 20.

Second Modification

In the above exemplary embodiment, controller 19 determines the ratio of the storage capacities used for the first conversion processing and the second conversion processing using one of the frame size and the frame rate of the first adjustment result and the second adjustment result, however, without being limited to this, controller 19 may determine the ratio of the storage capacities used for the first conversion processing and the second conversion processing using both of the frame size and the frame rate of the first adjustment result and the second adjustment result.

The fourth example is an example where a moving image having the frame size of 1920×1080 pixels and the frame rate of 60 Hz is input as the first content, and a moving image having the frame size of 1920×1080 pixels and the frame rate of 50 Hz is input as the second content. In addition, the fourth example is an example where the adjustment of the frame sizes are performed on the first content and the second content so that the frame sizes become 1440×810 pixels, the adjustment of the frame size is performed on the second content so that the frame size becomes 480×270 pixels, and the frame rate conversion processing is performed so that the two moving images on which the adjustment of these frame sizes are performed are displayed at the frame rates of 120 Hz on the same screen.

In the fourth example, in this case, in step S21 and step 22, the same processing as the processing for the second example in FIG. 5 is performed.

Then, in step S23, the following processing is performed. Controller 19 calculates the first ratio (one-to-three) being the ratio of the frame size (480×270 pixels) of the second adjustment result to the larger frame size (1440×810 pixels) of the first adjustment result and the second adjustment result. In addition, controller 19 calculates the ratio (two-to-one) of the reciprocal of the first frame rate (30 Hz) of the second adjustment result to the reciprocal of the frame rate (60 Hz) of the synthesis result as the second ratio. Then, controller 19 calculates the third ratio (a×c-to-b×d) obtained by multiplying the first ratio (a-to-b) and the second ratio (c-to-d). As a result, controller 19 calculates two-to-three as the ratio, and if the storage capacity of storage unit 16 is set to "100", controller 19 assigns the storage capacity of "40" to the first conversion processing in first converter 15, and assigns the storage capacity of "60" to the second conversion processing in second converter 18, based on the calculated two-to-three ratio.

In step S24, first converter 15 performs the first conversion processing using the storage capacity of "40" assigned by controller 19. Specifically, first converter 15 performs the processing of converting the second adjustment result so that the frame rate (30 Hz) of the second adjustment result becomes equal to the frame rate (60 Hz) of the first adjustment result as the first conversion processing.

In step S25, the same processing as the processing for the second example in FIG. 5 is performed.

In step S26, second converter 18 performs the second conversion processing using the storage capacity of "60" assigned by controller 19. Specifically, second converter 18 performs the second conversion processing of doubling the frame rate of the synthesis result received from synthesizer 17 from 60 Hz to 120 Hz, and outputs the result to display unit 20.

Third Modification

In the above exemplary embodiment, first converter 15 performs the processing of converting the second adjustment result as the first conversion processing so that the frame rate of the second adjustment result becomes equal to the frame rate of the first adjustment result, however, without being limited to this, first converter 15 may perform the processing of converting the first adjustment result and the second adjustment result as the first conversion processing so that the first frame rate being the frame rate of the first adjustment result and the second frame rate being the frame rate of the second adjustment result become the third frame rate different from the first frame rate and the second frame rate.

Figure 8:
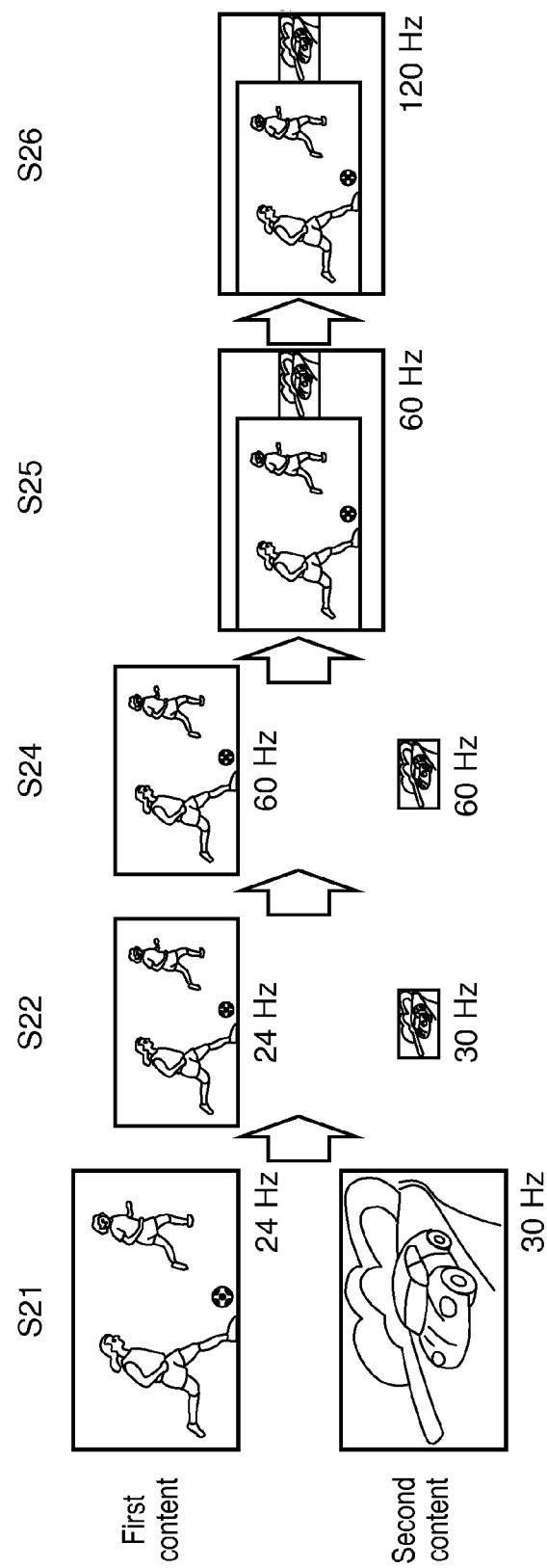
FIG. 8 is a diagram for illustrating a fifth, sixth, and seventh examples of the operation of the content processing device according to a third modification of the exemplary embodiment.

FIG. 8 is a diagram for illustrating the fifth, sixth, and seventh examples of the operation of the content processing device according to the third modification of the exemplary embodiment.

The fifth, sixth, and seventh examples are examples where moving images having the frame size of 1920×1080 pixels and the frame rate of 24 Hz are input as the first content, and moving images having the frame size of 1920×1080 pixels and the frame rate of 30 Hz are input as the second content. In addition, the fifth, sixth, and seventh examples are examples where the adjustment of the frame sizes are performed on the first content and the second content so that the frame sizes become 1440×810 pixels, the adjustment of the frame size is performed on the second content so that the frame size becomes 480×270 pixels, and the frame rate conversion processing is performed so that the two moving images on which the adjustment of these frame sizes are performed are displayed at the frame rates of 120 Hz on the same screen.

Here, the fifth example is an example of using the frame sizes of the first adjustment result and the second adjustment result as attributes, the sixth example is an example of using the frame rates of the first adjustment result and the second adjustment result as attributes, and the seventh example is an example of using the frame sizes and frame rates of the first adjustment result and the second adjustment result as attributes.

The fifth example will be described below.

In the fifth example, in this case, in step S21 and step 22, the same processing as the processing for the second example in FIG. 5 is performed.

Then, in step S23, the following processing is performed. Controller 19 performs the control of assigning the storage capacities corresponding to the ratio of one-to-one to the first conversion processing and the second conversion processing. Specifically, controller 19 calculates the ratio of the larger frame size of the first adjustment result and the second adjustment result on which the frame rate conversion processing is actually performed in the first conversion processing, to the larger frame size of the first adjustment result and the second adjustment result, therefore, the ratio is one-to-one. As a result, if the storage capacity of storage unit 16 is set to "100", controller 19 assigns the storage capacity of "50" to the first conversion processing in first converter 15, and assigns the storage capacity of "50" to the second conversion processing in second converter 18, based on the calculated one-to-one ratio.

In step S24, first converter 15 performs the first conversion processing using the storage capacity of "50" assigned by controller 19. Specifically, first converter 15 performs the processing of converting the first adjustment result and the second adjustment result as the first conversion processing so that the first frame rate (24 Hz) of the first adjustment result and the second frame rate (30 Hz) of the second adjustment result become the third frame rate (60 Hz).

In step S25, the same processing as the processing for the first example in FIG. 5 is performed.

In step S26, second converter 18 performs the second conversion processing using the storage capacity of "50" assigned by controller 19. Specifically, second converter 18 performs the second conversion processing of doubling the frame rate of the synthesis result received from synthesizer 17 from 60 Hz to 120 Hz, and outputs the result to display unit 20.

Next, the sixth example will be described below.

In the sixth example, in this case, in step S21 and step 22, the same processing as the processing for the second example in FIG. 5 is performed.

In step S23, the following processing is performed. As for the ratio, controller 19 calculates the ratio of the reciprocal of the lower frame rate (that is, 24 Hz) of the first frame rate (24 Hz) and the second frame rate (30 Hz) to the reciprocal of the frame rate (60 Hz) of the synthesis result after the second conversion processing, and performs the control of assigning the storage capacities corresponding to the ratio to the first conversion processing and the second conversion processing. As a result, controller 19 calculates five-to-two as the ratio. When the storage capacity of storage unit 16 is set to "100", controller 19 assigns the storage capacity of "71" to the first conversion processing in first converter 15, and assigns the storage capacity of "28" to the second conversion processing in second converter 18, based on the calculated five-to-two ratio.

In step S24, first converter 15 performs the first conversion processing using the storage capacity of "71" assigned by controller 19. Specifically, first converter 15 performs the processing of converting the first adjustment result and the second adjustment result as the first conversion processing so that the first frame rate (24 Hz) of the first adjustment result and the second frame rate (30 Hz) of the second adjustment result become the third frame rate (60 Hz).

In step S25, the same processing as the processing for the second example in FIG. 5 is performed.

In step S26, second converter 18 performs the second conversion processing using the storage capacity of "28" assigned by controller 19. Specifically, second converter 18 performs the second conversion processing of doubling the frame rate of the synthesis result received from synthesizer 17 from 60 Hz to 120 Hz, and outputs the result to display unit 20.

Lastly, the seventh example will be described below.

In the seventh example, in this case, in step S21 and step 22, the same processing as the processing for the second example in FIG. 5 is performed.

Then, in step S23, the following processing is performed. Controller 19 calculates the first ratio of one-to-one using the frame sizes of the first adjustment result and the second adjustment result. In addition, as for the second ratio, controller 19 calculates the ratio (five-to-two) of the reciprocal of the lower frame rate (that is, 24 Hz) of the first frame rate (24 Hz) and the second frame rate (30 Hz) to the reciprocal of the frame rate (60 Hz) of the synthesis result after the second conversion processing. Then, controller 19 calculates the third ratio (a×c-to-b×d) obtained by multiplying the first ratio (a-to-b) and the second ratio (c-to-d), and performs the control of assigning the storage capacities corresponding to the ratio to the first conversion processing and the second conversion processing. As a result, controller 19 calculates five-to-two as the ratio. When the storage capacity of storage unit 16 is set to "100", controller 19 assigns the storage capacity of "71" to the first conversion processing in first converter 15, and assigns the storage capacity of "28" to the second conversion processing in second converter 18, based on the calculated five-to-two ratio.

In step S24, first converter 15 performs the first conversion processing using the storage capacity of "71" assigned by controller 19. Specifically, first converter 15 performs the processing of converting the first adjustment result and the second adjustment result as the first conversion processing so that the first frame rate (24 Hz) of the first adjustment result and the second frame rate (30 Hz) of the second adjustment result become the third frame rate (60 Hz).

In step S25, the same processing as the processing for the second example in FIG. 5 is performed.

In step S26, second converter 18 performs the second conversion processing using the storage capacity of "28" assigned by controller 19. Specifically, second converter 18 performs the second conversion processing of doubling the frame rate of the synthesis result received from synthesizer 17 from 60 Hz to 120 Hz, and outputs the result to display unit 20.

Fourth Modification

In the above exemplary embodiment, into content processing device 1, a plurality of pieces of content of the first content and the second content are input, however, without being limited to this, only one piece of content may be input.

Figure 9:
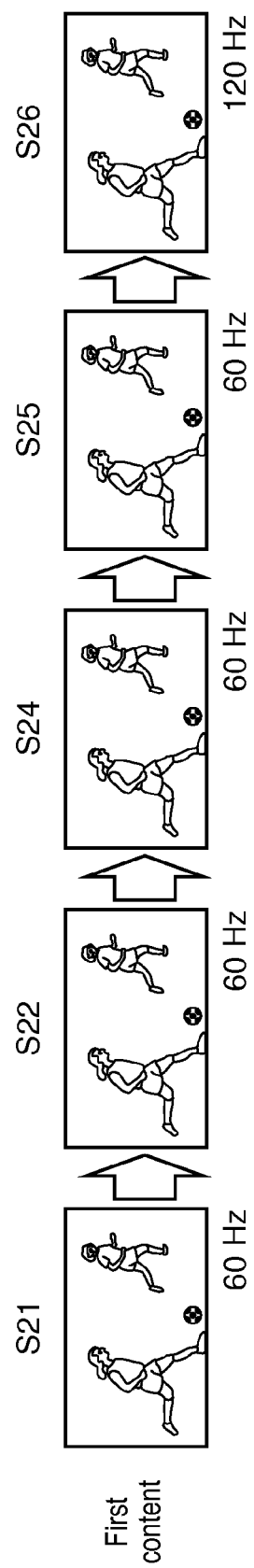
FIG. 9 is a diagram for illustrating an eighth example of the operation of the content processing device according to a fourth modification of the exemplary embodiment.

FIG. 9 is a diagram for illustrating the eighth example of the operation of the content processing device according to the fourth modification of the exemplary embodiment.

FIG. 9 shows an example where the first content including a plurality of consecutive frames with 1920×1080 pixels and 60 Hz is input, and displayed as a single-screen remaining 1920×1080 pixels and 60 Hz.

In this case, in step S21, the following processing is performed. The first content having the frame size of 1920×1080 pixels and the frame rate of 60 Hz is input into first input unit 11 as the first content. First input unit 11 detects the frame size and the frame rate of the first content, and outputs the detected frame size and the detected frame rate of the first content to controller 19.

In step S22, first adjuster 13 performs the processing for adjusting the first content received from first input unit 11 to the screen size of display unit 20, however, there is no need to change the screen size, therefore, first adjuster 13 outputs the first adjustment result having the frame size kept as it is to first converter 15.

In the eighth example, the first conversion processing by first converter 15 is not performed. The first conversion processing by first converter 15 is not performed, therefore, in step S23, controller 19 performs the control of assigning the entire storage capacity of storage unit 16 to the second conversion processing. If the memory capacity of storage unit 16 is set to "100", controller 19 assigns "100" to the second conversion processing in second converter 18.

In step S24, first converter 15 outputs the first content as it is received from first adjuster 13 to synthesizer 17.

In step S25, synthesizer 17 outputs the first content as it is received from first converter 15 to second converter 18.

In step S26, second converter 18 performs the second conversion processing using the storage capacity of "100" assigned by controller 19. Specifically, second converter 18 performs the second conversion processing of doubling the frame rate of the first content received from synthesizer 17 from 60 Hz to 120 Hz, and outputs the result to display unit 20.

Fifth Modification

In the above exemplary embodiment, examples where two pieces of content of the first content and the second content are displayed in two-screen mode on display unit 20 are described, however, without being limited to this, even when three or more pieces of content are displayed in multi-screen mode on display unit 20, controller 19 performs the same control.

Sixth Modification

In the above exemplary embodiment, first converter 15 selects the adjustment result having the lower frame rate of the first adjustment result and the second adjustment result, and performs the frame rate conversion processing on the selected adjustment result so that the frame rate of the selected adjustment result becomes equal to the frame rate of the non-selected adjustment result, however, the selection of the adjustment result to be the target of the frame rate conversion processing does not need to be performed by first converter 15.

Figure 10:
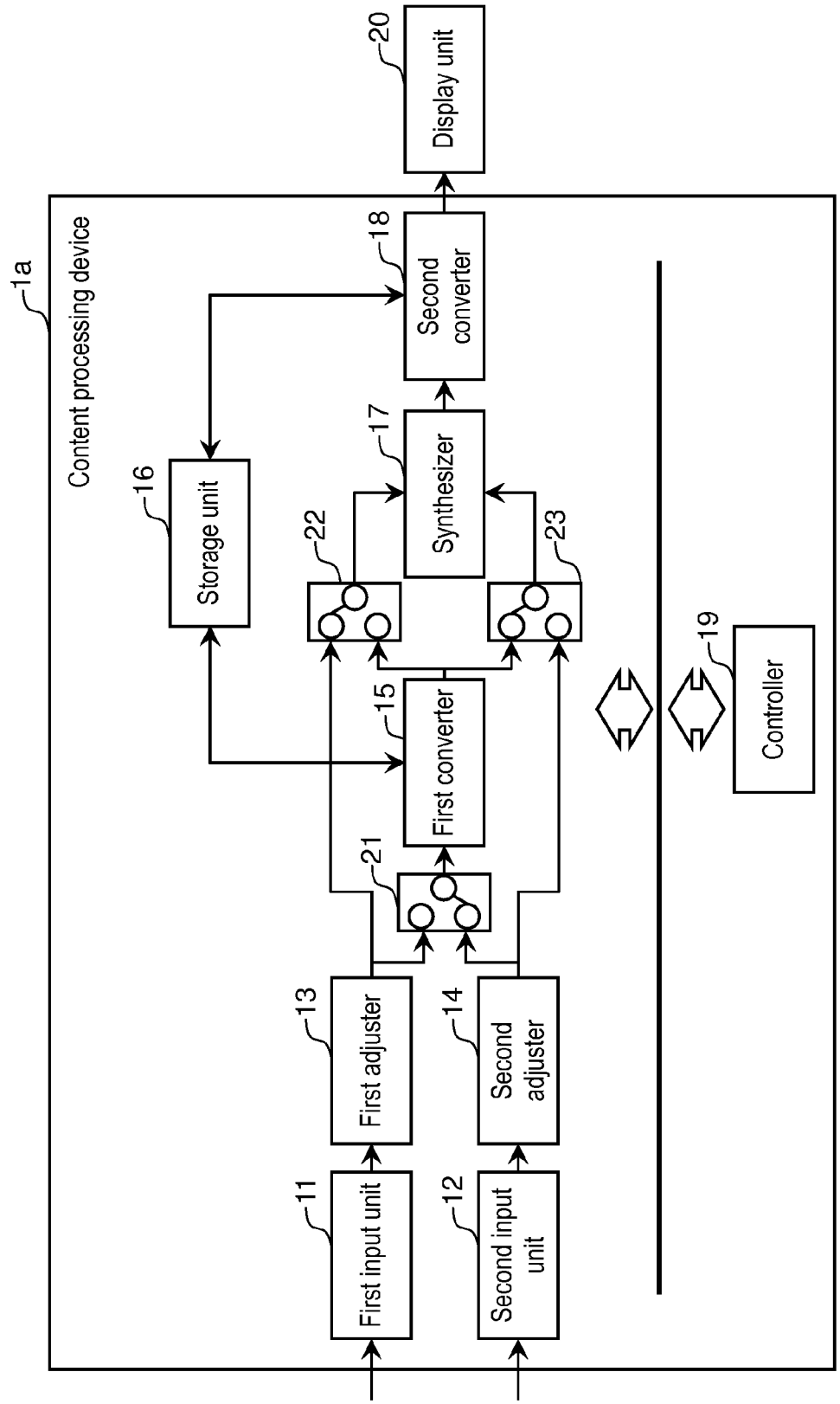
FIG. 10 is a block diagram illustrating a configuration of a content processing device according to a sixth modification of the exemplary embodiment.

FIG. 10 is a block diagram illustrating the configuration of the content processing device according to the sixth modification of the exemplary embodiment.

In FIG. 10, compared with content processing device 1 of the exemplary embodiment, content processing device 1a further includes first switch 21, second switch 22, and third switch 23. Content processing device 1a has the same configuration as content processing device 1 except that first switch 21, second switch 22, and third switch 23 are provided and first converter 15 does not perform the processing of the selection. Therefore, the description thereof will be omitted.

First switch 21 receives the output of first adjuster 13 and the output of second adjuster 14. In addition, first switch 21 selects one of the first adjustment result received from first adjuster 13 and the second adjustment result received from second adjuster 14 to output to first converter 15. More specifically, first switch 21 selects the adjustment result having the lower frame rate of the first adjustment result and the second adjustment result, and outputs the selected adjustment result to first converter 15.

Second switch 22 selects one of the first adjustment result received from first adjuster 13 and the conversion processing result which is subjected to the first conversion processing and received from first converter 15, and the selected one of the first adjustment result and the conversion processing result is output to synthesizer 17. More specifically, when the first adjustment result is selected by first switch 21, second switch 22 selects the conversion processing result on which the first conversion processing is performed in first converter 15. On the other hand, when the second adjustment result is selected by first switch 21, second switch 22 selects the first adjustment result enlarged or reduced by first adjuster 13.

Third switch 23 selects one of the second adjustment result received from second adjuster 14 and the conversion processing result which is subjected to the first conversion processing and received from first converter 15, and outputs the selected one of the second adjustment result and the conversion processing result to synthesizer 17. More specifically, when the first adjustment result is selected by first switch 21, third switch 23 selects the second adjustment result enlarged or reduced in second adjuster 14. On the other hand, when the second adjustment result is selected by first switch 21, third switch 23 selects the conversion processing result on which the first conversion processing is performed in first converter 15.

As described above, the content processing device 1*a* having a configuration in which the adjustment result to be the target of the first conversion processing is selected by using first switch 21, and the moving image to be the target synthesized by synthesizer 17 is selected by using second switch 22 and third switch 23 may be employed.

Seventh Modification

In the exemplary embodiment and its modified examples, in each of content processing devices 1 and 1*a*, first adjuster 13, and second adjuster 4, the enlargement or reduction of the frame size of the first content and the second content are performed, however, the enlargement or reduction of the frame size does not necessarily have to be performed. That is, there may be a case where first adjuster 13 performs the adjustment without enlarging or reducing the first content, and there may be a case where second adjuster 14 performs the adjustment without enlarging or reducing the second content. In addition, the content processing device does not need to include first adjuster 13 and second adjuster 14.

As described above, the exemplary embodiment is described as the exemplary technology in the present disclosure. For this reason, the accompanying drawings and detailed description are provided.

Therefore, in the components described in the accompanying drawings and the detailed description, not only the essential components for solving problems, but also the non-essential components for solving problems so as to illustrate the implementation, may be included. Therefore, it should not be determined immediately that those non-essential components are essential, only because those non-essential components are described in the accompanying drawings and detailed description.

In addition, the exemplary embodiment described above is intended to illustrate the technology in the present disclosure, therefore, various changes, replacements, additions, omissions, and the like can be performed within the scope of the claims or their equivalents.

The present disclosure is useful as the content processing technology.

What is claimed is:

1. A content processing device comprising:
   a first input unit into which a first content being a moving image including a plurality of consecutive frames is input;
   a second input unit into which a second content being a moving image including a plurality of consecutive frames, and being different from the first content in frame rate is input;
   a first adjuster to adjust a frame size by enlarging or reducing the first content, and to output a first adjustment result being a result of adjustment;
   a second adjuster to adjust a frame size by enlarging or reducing the second content, and to output a second adjustment result being a result of adjustment;
   a first converter to perform first conversion processing of converting frame rates of the first adjustment result and the second adjustment result so that the frame rates become equal to each other, and to output respective results of the first conversion processing as a first conversion result and a second conversion result;
   a synthesizer to perform a screen synthesis for displaying the first conversion result and the second conversion result side by side on a same screen, and to output a synthesis result being a result of the screen synthesis;
   a second converter to perform second conversion processing of converting a frame rate of the synthesis result to a frame rate higher than the frame rate before being converted;
   a storage unit to temporarily store frames required for the first conversion processing and the second conversion processing during the first conversion processing and the second conversion processing; and
   a controller to calculate a ratio of storage capacities of the storage unit to be assigned to the first conversion processing and the second conversion processing in accordance with attributes related to motion amounts of moving images of the first adjustment result and the second adjustment result, and to perform control of assigning the storage capacities corresponding to the ratio to the first conversion processing and the second conversion processing, wherein the first converter and the second converter respectively perform the first conversion processing and the second conversion processing using the respective storage capacities assigned by the controller,
   wherein the attributes are frame sizes and the frame rates of the first adjustment result and the second adjustment result, wherein the first converter performs processing of converting the second adjustment result as the first conversion processing so that the frame rate of the second adjustment result becomes equal to the frame rate of the 5 first adjustment result, and
   wherein the controller
   (i) calculates
   a first ratio being a ratio of the frame size of the second adjustment result to a larger frame size of the frame sizes of the first adjustment result and the second adjustment result, and
   a second ratio being a ratio of a reciprocal of the frame rate of the second adjustment result to a reciprocal of the frame rate of the synthesis result, and
   (ii) calculates a third ratio obtained by multiplying the first ratio and the second ratio as the ratio.

2. The content processing device according to claim 1, wherein the attributes are frame sizes of the first adjustment result and the second adjustment result, wherein the first converter performs processing of converting the second adjustment result as the first conversion processing so that the frame rate of the second adjustment result becomes equal to the frame rate of the first adjustment result, and wherein the controller calculates a ratio of the frame size of the second adjustment result to a larger frame size of the frame sizes of the first adjustment result and the second adjustment result as the ratio.

3. The content processing device according to claim 1, wherein the attributes are the frame rates of the first adjustment result and the second adjustment result, wherein the first converter performs processing of converting the second adjustment result as the first conversion processing so that the frame rate of the second adjustment result becomes equal to the frame rate of the first adjustment result, and wherein the controller calculates a ratio of a reciprocal of the frame rate of the second adjustment result to a reciprocal of the frame rate of the synthesis result as the ratio.

4. The content processing device according to claim 1, wherein the attributes are frame sizes of the first adjustment result and the second adjustment result, wherein the first converter performs processing of converting the first adjustment result and the second adjustment result as the first conversion processing so that a first frame rate being the frame rate of the first adjustment result and a second frame rate being the frame rate of the second adjustment result become a third frame rate different from the first frame rate and the second frame rate, and wherein the controller sets the ratio as one-to-one.

5. The content processing device according to claim 1, wherein the attributes are the frame rates of the first adjustment result and the second adjustment result,
wherein the first converter performs processing of converting the first adjustment result and the second adjustment result as the first conversion processing so that a first frame rate being the frame rate of the first adjustment result and a second frame rate being the frame rate of the second adjustment result become a third frame rate different from the first frame rate and the second frame rate, and wherein the controller calculates a ratio of a reciprocal of a lower frame rate of the first frame rate and the second frame rate to a reciprocal of the frame rate of the synthesis result as the ratio.

6. The content processing device according to claim 1, wherein the attributes are frame sizes and the frame rates of the first adjustment result and the second adjustment result,
wherein the first converter performs processing of converting the first adjustment result and the second adjustment result as the first conversion processing so that a first frame rate being the frame rate of the first adjustment result and a second frame rate being the frame rate of the second adjustment result become a third frame rate different from the first
frame rate and the second frame rate, and wherein the controller
(i) calculates
a first ratio being one-to-one, and
a second ratio being a ratio of a reciprocal of a lower frame rate of the first frame rate and the second frame rate to a reciprocal of the frame rate of the synthesis result, and
(ii) calculates a third ratio obtained by multiplying the first ratio and the second ratio as the ratio.

7. A content processing method performed in a content processing device, the content processing device to perform processing of converting a frame rate of a moving image, the content processing device comprising a storage unit to temporarily store a frame necessary for the processing of converting, the content processing method comprising:
receiving a first content being a moving image that includes a plurality of consecutive frames;
receiving a second content being a moving image different from the first content in frame rate, the moving image including a plurality of consecutive frames;
adjusting a frame size by enlarging or reducing the first content, and outputting a first adjustment result being a result of the adjustment;
adjusting a frame size by enlarging or reducing the second content, and outputting a second adjustment result being a result of the adjustment;
performing first conversion processing of converting frame rates of the first adjustment result and the second adjustment result so that the frame rates become equal to each other, and outputting respective results of the first conversion processing as a first conversion result and a second conversion result;
performing a screen synthesis for displaying the first conversion result and the second conversion result side by side on a same screen, and outputting a synthesis result being a result of the screen synthesis;
performing second conversion processing of converting a frame rate of the synthesis result to a frame rate higher than the frame rate before being converted; and
calculating a ratio of storage capacity of the storage unit to be assigned to each of the first conversion processing and the second conversion processing in accordance with attributes related to motion amounts of moving images of the first adjustment result and the second adjustment result, and performing control of assigning the storage capacity corresponding to the ratio to each of the first conversion processing and the second conversion processing, wherein the first conversion processing and the second conversion processing are performed using the respective storage capacities assigned in the step of performing control,
wherein the attributes are frame sizes and the frame rates of the first adjustment result and the second adjustment result, wherein the first converter performs processing of converting the second adjustment result as the first conversion processing so that the frame rate of the second adjustment result becomes equal to the frame rate of the first adjustment result, and
wherein the controller
(i) calculates
a first ratio being a ratio of the frame size of the second adjustment result to a larger frame size of the frame sizes of the first adjustment result and the second adjustment result, and
a second ratio being a ratio of a reciprocal of the frame rate of the second adjustment result to a reciprocal of the frame rate of the synthesis result, and
(ii) calculates a third ratio obtained by multiplying the first ratio and the second ratio as the ratio.

8. An integrated circuit comprising:
a first input into which a first content being a moving image including a plurality of consecutive frames is input;
a second input into which a second content being a moving image including a plurality of consecutive frames, and being different from the first content in frame rate is input;
a first adjuster to adjust a frame size by enlarging or reducing the first content, and to output a first adjustment result being a result of adjustment; a second adjuster configured to adjust a frame size by enlarging or reducing the second content, and to output a second adjustment result being a result of adjustment;
a first converter to perform first conversion processing of converting frame rates of the first adjustment result and the second adjustment result so that the frame rates become equal to each other, and to
output respective results of the first conversion processing as a first conversion result and a second conversion result;
a synthesizer to perform a screen synthesis for displaying the first conversion result and the second conversion result side by side on a same screen, and to output a synthesis result being a result of the screen synthesis; a second converter configured to perform second conversion processing of converting a frame rate of the synthesis result to a frame rate higher than the frame rate before being converted;

a storage unit to temporarily store frames required for the first conversion processing and the second conversion processing during the first conversion processing and the second conversion processing; and a controller to calculate a ratio of storage capacities of the storage unit to be assigned to the first conversion processing and the second conversion processing in accordance with attributes related to motion amounts of moving images of the first adjustment result and the second adjustment result, and to perform control of assigning the storage capacities corresponding to the ratio to the first conversion processing and the second conversion processing, wherein the first converter and the second converter respectively perform the first conversion processing and the second conversion processing using the respective storage capacities assigned by the controller, wherein the attributes are frame sizes and the frame rates of the first adjustment result and the second adjustment result, wherein the first converter performs processing of converting the second adjustment result as the first conversion processing so that the frame rate of the second adjustment result becomes equal to the frame rate of the first adjustment result, and wherein the controller (i) calculates a first ratio being a ratio of the frame size of the second adjustment result to a larger frame size of the frame sizes of the first adjustment result and the second adjustment result, and a second ratio being a ratio of a reciprocal of the frame rate of the second adjustment result to a reciprocal of the frame rate of the synthesis result, and (ii) calculates a third ratio obtained by multiplying the first ratio and the second ratio as the ratio.

* * * * *